(12) United States Patent
Tamura et al.

(10) Patent No.: US 9,363,813 B2
(45) Date of Patent: Jun. 7, 2016

(54) MOBILE COMMUNICATIONS SYSTEM, GATEWAY, METHOD OF CONTROLLING GATEWAY, AND COMPUTER READABLE MEDIUM THEREFOR

(71) Applicant: NEC CORPORATION, Minato-ku, Tokyo (JP)

(72) Inventors: Tomu Tamura, Tokyo (JP); Yoshio Ueda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 137 days.

(21) Appl. No.: 13/917,872

(22) Filed: Jun. 14, 2013

(65) Prior Publication Data

US 2013/0344880 A1    Dec. 26, 2013

(30) Foreign Application Priority Data

Jun. 22, 2012   (JP) ................. 2012-140300

(51) Int. Cl.
*H04W 40/00* (2009.01)
*H04W 72/04* (2009.01)
*H04W 16/02* (2009.01)
(Continued)

(52) U.S. Cl.
CPC .......... *H04W 72/0433* (2013.01); *H04W 16/02* (2013.01); *H04W 28/18* (2013.01); *H04W 76/007* (2013.01); *H04W 84/045* (2013.01); *H04W 88/08* (2013.01); *H04W 88/16* (2013.01)

(58) Field of Classification Search
CPC . H04W 28/08; H04W 84/045; H04W 76/022; H04W 36/14; H04W 76/02; H04W 48/18; H04W 92/12; H04W 28/12; H04W 88/08; H04W 88/16; H04W 48/16

USPC .............. 455/436, 438, 439, 444, 435.1, 411, 455/525, 433, 443, 449
See application file for complete search history.

(56) References Cited

U.S. PATENT DOCUMENTS

| 8,630,607 B2* | 1/2014 | Shaikh ....................... 455/404.1 |
| 2011/0122822 A1* | 5/2011 | Wu et al. ....................... 370/328 |
| 2012/0140697 A1* | 6/2012 | Chen et al. ..................... 370/315 |

FOREIGN PATENT DOCUMENTS

| EP | 2101524 A1 | 9/2009 |
| JP | 201123796 A | 2/2011 |
| JP | 2011512105 A | 4/2011 |

OTHER PUBLICATIONS

International Search Report dated Jun. 25, 2013 from the International Searching Authority in counterpart Application No. PCT/JP2013/003323.

(Continued)

*Primary Examiner* — Olumide T Ajibade Akonai
(74) *Attorney, Agent, or Firm* — Sughrue Mion, PLLC

(57) ABSTRACT

A gateway communicating with a base station, includes a receiver that receives an incoming message including identification information of the base station and one or more parameters indicating an environment of the base station. The gateway also includes a memory that stores correspondence information including a cell identifier in association with at least one of the received identification information and the received one or more parameters. The gateway also includes a controller that determines the cell identifier, corresponding to a cell of the base station, based on the correspondence information and the incoming message, and generates an outgoing message, including the determined cell identifier, to be sent to a core network device. The gateway also includes a transmitter adapted to transmit the outgoing message.

10 Claims, 10 Drawing Sheets

(51) Int. Cl.
    *H04W 28/18*     (2009.01)
    *H04W 88/08*     (2009.01)
    *H04W 88/16*     (2009.01)
    *H04W 76/00*     (2009.01)
    *H04W 84/04*     (2009.01)

(56) References Cited

OTHER PUBLICATIONS

Written Opinion dated Jun. 25, 2013 from the International Searching Authority in counterpart Application No. PCT/JP2013/003323.
3GPP TS23.271 v10.2.0, "3rd Generation Partnership Project, Technical Specification Group Services and System Aspects; Functional stage 2 description of Location Services (LCS) (Release 10)", Mar. 2011, pp. 1-169, vol. 10.2.0.
3GPP TS23.167 v11.4.0, "3rd Generation Partnership Project; Technical Specification Group Services and System Aspects; IP Multimedia Subsystem (IMS) emergency sessions (Release 11)", Mar. 2012, pp. 1-42, vol. 11.4.0.
3GPP TS22.220 v11.3.0, "3rd Generation Partnership Project; Technical Specification Group Services and System Aspects; Service requirements for Home Node B (HNB), and Home eNode B (HeNB) (Release 11)", Sep. 2011, pp. 1-25, vol. 11.3.0.
3GPP TS36.413 v10.3.0, "3rd Generation Partnership Project; Technical Specification Group Services and System Aspects; Evolved Universal Terrestrial Radio Access Network (E-UTRAN), S1 Application Protocol (S1AP) (Release 10)", Sep. 2011, pp. 1-255, vol. 10.3.0.

\* cited by examiner

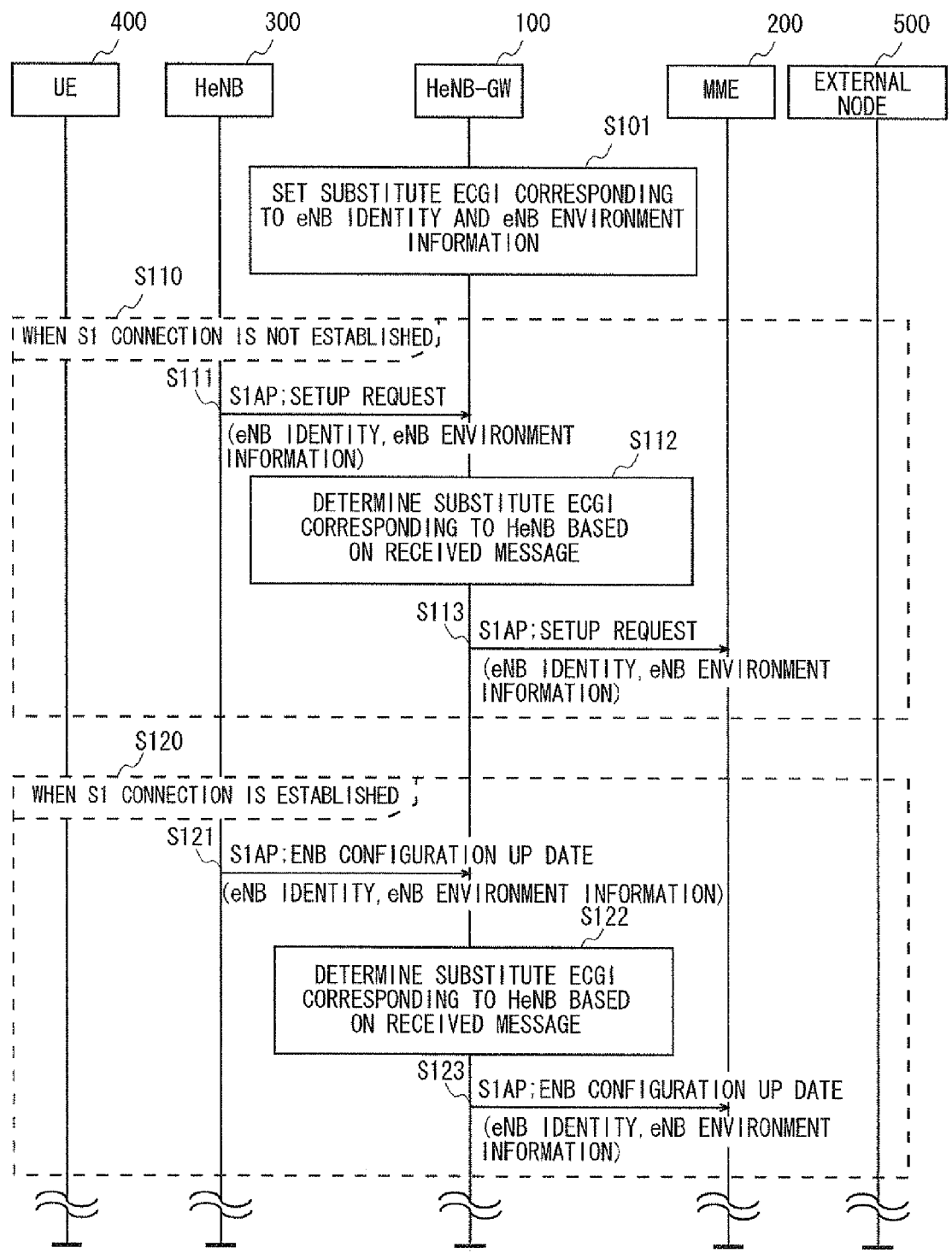

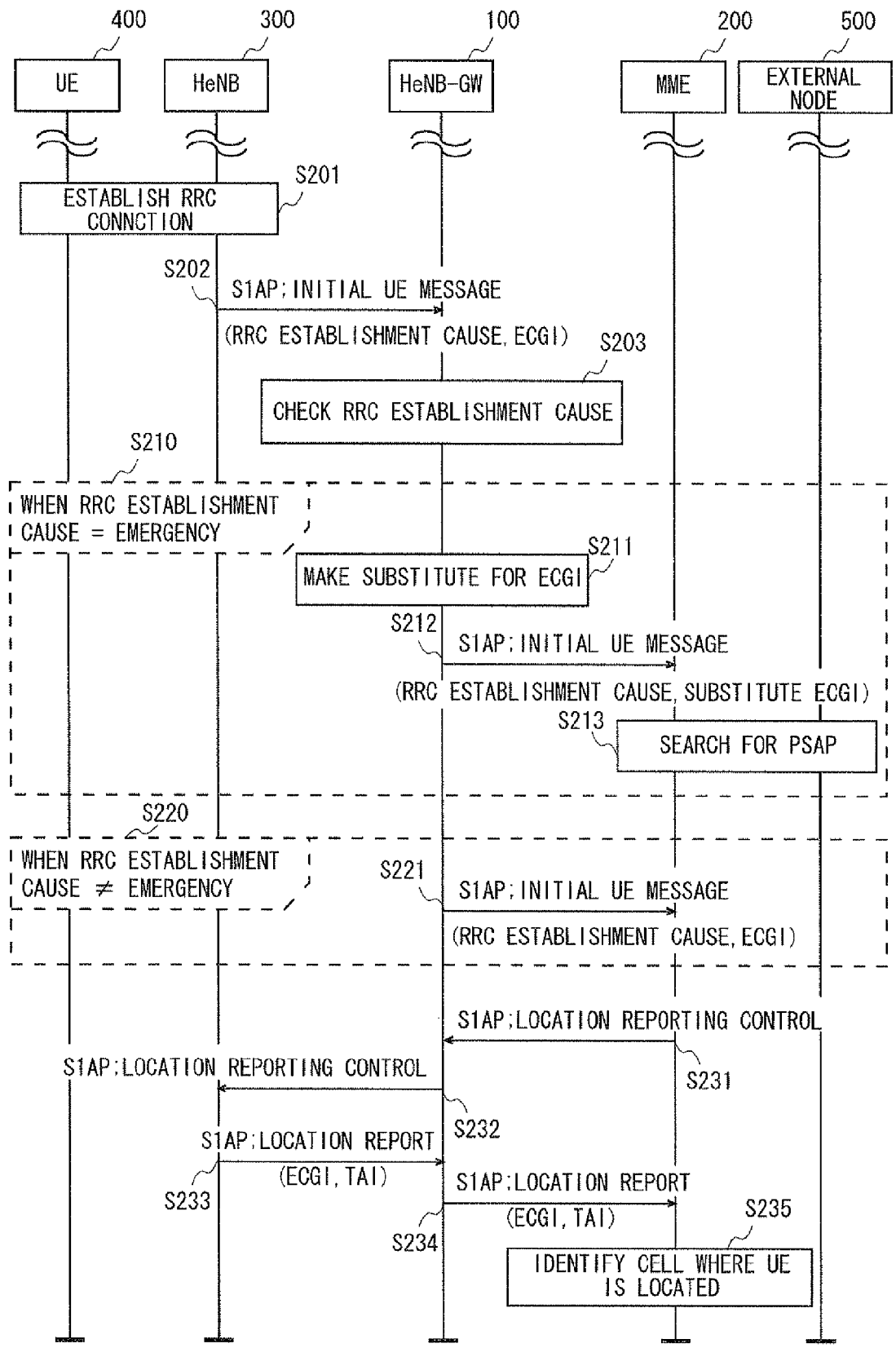

Fig. 5

9.1.8.4  S1 SETUP REQUEST

This message is sent by the eNB to transfer information for a TNL association
Direction: eNB → MME

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Global eNB ID | M | | 9.2.1.37 | | YES | reject |
| eNB Name | O | | PrintableString(1..150 ...) | | YES | ignore |
| Supported TAs | | 1..<maxnoofTACs> | | Supported TAs in the eNB | GLOBAL | reject |
| >TAC | M | | 9.2.3.7 | Broadcasted TAC | | |
| >Broadcast PLMNs | | 1..<maxnoofBPLMNs> | | Broadcasted PLMNs | | |
| >>PLMN Identity | M | | 9.2.3.8 | | | |
| Default paging DRX | M | | 9.2.1.16 | | YES | ignore |
| CSG Id List | | 0..1 | | | GLOBAL | reject |
| >CSG Id | M | 1 to <maxnoofCSGIds> | 9.2.1.62 | | | |
| eNB Identity | O | | 9.2.aa | | YES | ignore |
| eNB Environment Information | O | | 9.2.bb | | YES | ignore |

| Range bound | Explanation |
|---|---|
| maxnoofTACs | Maximum no. of TACs. Value is 256. |

| Range bound | Explanation |
|---|---|
| maxnoofBPLMNs | Maximum no. of Broadcasted PLMNs. Value is 6. |

| Range bound | Explanation |
|---|---|
| maxnoofCSGIds | Maximum no. of CSG Ids within the CSG Id List. Value is 256. |

Fig. 6

9.1.8.7 ENB CONFIGURATION UPDATE
This message is sent by the eNB to transfer updated information for a TNL association.
Direction: eNB → MME

| IE/Group Name | Presence | Range | IE type and reference | Semantics description | Criticality | Assigned Criticality |
|---|---|---|---|---|---|---|
| Message Type | M | | 9.2.1.1 | | YES | reject |
| eNB Name | O | | PrintableString(1..150,...) | | YES | ignore |
| Supported TAs | | 0..<maxnoofTACs> | | Supported TAs in the eNB | GLOBAL | reject |
| >TAC | M | | 9.2.3.7 | Broadcasted TAC | - | |
| >Broadcast PLMNs | | 1..<maxnoofBPLMNs> | | Broadcasted PLMNs | - | |
| >>PLMN Identity | M | | 9.2.3.8 | | - | |
| CSG Id List | | 0..1 | | | GLOBAL | reject |
| >CSG Id | M | 1 to <maxnoofCSGIds> | 9.2.1.62 | | - | |
| Default paging DRX | O | | 9.2.1.16 | | YES | ignore |
| eNB Identity | O | | 9.2.aa | | YES | ignore |
| eNB Environment Information | O | | 9.2.bb | | YES | ignore |

| Range bound | Explanation |
|---|---|
| maxnoofTACs | Maximum no. of TACs. Value is 256. |
| maxnoofBPLMNs | Maximum no. of Broadcasted PLMNs. Value is 6. |
| maxnoofCSGIds | Maximum no. of CSG Ids within the CSG Id List. Value is 256 |

Fig. 7

9.2.aa eNB Identity
*eNB Identity* IE is sent from the eNB to the MME and identifies the eNB.

| IE/Group Name | Presence | Range | IE type and reference | Semantics description |
|---|---|---|---|---|
| eNB Identity | | | OCTET STRING (SIZE(1..255)) | See note below. |

Note:
The octet string shall take form of an Network Access Identifier (NAI) as defined in IETF RFC 4282[13].
The format of the eNB-Identity will be:
0<IMSI>@<realm>
Or
1<OUI>-<SerialNumber>@<realm>
Where <IMSI> is a 16 digit number coded as specified in TS23.003[xx];
and <OUI> and <SerialNumber> are coded as specified in TR-069[xx].

Fig. 8

9.2.bb    eNB Environment Information

The *eNB Environment Information* IE is sent from the eNB to MME to provide eNB Environment Information.

| IE/Group Name | Presence | Range | IE type and reference | Semantics description | Criticality | Assigned Criticality |
|---|---|---|---|---|---|---|
| eNB Environment Information | | 1 | | | - | - |
| >Radio Information | O | | 9.2.cc | | - | - |
| >Non Radio Information | O | | 9.2.dd | | - | - |

Fig. 9A

9.2.cc    Radio Information

The Radio Information IE is composed of the received information from the surrounding base stations, WiMAX base stations, wireless internet hotspots, television stations, radio stations and GPS.

| IE/Group Name | Presence | Range | IE type and reference | Semantics description |
|---|---|---|---|---|
| E-UTRAN Cell ID Information | O | 1..<maxnoof RadioInfo> | | |
| >TAC | M | | 9.2.3.7 | |
| >PLMN-ID | M | | 9.2.3.8 | |
| >Cell Identity | M | | BIT STRING (28) | The leftmost bits of the Cell Identity correspond to the eNB ID (defined in sub clause 9.2.1.37) |
| >Received Signal Strength | M | | 9.2.xx | |
| UTRAN Cell ID Information | O | 1..<maxnoofR adioInfo> | | |
| >LAC | M | | 9.2.xx | |
| >RAC | M | | 9.2.xx | |
| >URA identity list | M | 1..<MaxURA> | 9.2.xx | |
| >>URA identity | M | | URA identity 9.2.xx | |
| >PLMN-ID | M | | 9.2.xx | |
| >Cell-ID | M | | 9.2.xx | |
| >Received Signal Strength | M | | 9.2.xx | |
| GERAN Cell ID Information | O | 1..<maxnoofR adioInfo> | | |
| >PLMN-ID | M | | 9.2.xx | |
| >LAC | M | | 9.2.xx | 0000 and FFFE not allowed |
| >CI | M | | OCTET STRING (2) | |
| >Received Signal Strength | M | | 9.2.xx | |
| WiMAX base stations Information | O | 1..<maxnoofR adioInfo> | | |
| >BSID | M | | 9.2.xx | |
| >Paging Group ID | M | | 9.2.xx | |
| >Received Signal Strength | M | | 9.2.xx | |
| Wireless Internet hotspots Information | | 1..<maxnoofR adioInfo> | | |
| >BSSID | M | | 9.2.xx | |
| >ESSID | M | | 9.2.xx | |
| >Received Signal Strength | M | | 9.2.xx | |

Fig. 9B

| | | | | |
|---|---|---|---|---|
| *Television stations Information* | O | 1..<maxnoofRadioInfo> | 9.2.xx | |
| >TV Frequency | M | | 9.2.xx | |
| >Received Signal Strength | M | | 9.2.xx | |
| *Radio stations Information* | O | 1..<maxnoofRadioInfo> | 9.2.xx | |
| >Radio Frequency | M | | 9.2.xx | |
| >Received Signal Strength | M | | 9.2.xx | |
| *GPS Information* | O | 1..<maxnoofRadioInfo> | | |
| >Geographical Coordinates | M | | | |
| >>Latitude Sign | M | | ENUMERATED (North, South) | |
| >>Degrees Of Latitude | M | | INTEGER (0..$2^{23}$-1) | The IE value (N) is derived by this formula: $N \leq 2^{23} \times X / 90 < N+1$ X being the latitude in degrees (0°..90°) |
| >>Degrees Of Longitude | M | | INTEGER (-$2^{23}$..$2^{23}$-1) | The IE value (N) is derived by this formula: $N \leq 2^{24} \times X / 360 < N+1$ X being the longitude in degree (-180°..+180°) |
| >Altitude and Direction | M | | | |
| >>Direction of Altitude | M | | ENUMERATED (Height, Depth) | |
| >>Altitude | M | | INTEGER (0..$2^{15}$-1) | The relation between the value (N) and the altitude (a) in meters it describes is $N \leq a < N+1$, except for $N=2^{15}-1$ for which the range is extended to include all greater values of (a). |

| Range bound | Explanation |
|---|---|
| maxnoofRadioInfo | Maximum no. of reported information. Value is xx. |

Fig. 10

9.2.dd    Non Radio Information
This IE indicates non radio information such as IP address, phone number of the fixed line, address, postcode, and, if any, the identifier of the previously connected HeNB-GW.

| IE/Group Name | Presence | Range | IE type and reference | Semantics description |
|---|---|---|---|---|
| CHOICE *IP Address* | O | | | |
| >*IPV4* | | | | |
| >>Internet Address ipv4 | M | | OCTET STRING(4) | |
| >*IP6* | | | | |
| >>Internet Address ipv6 | M | | OCTET STRING(16) | |
| Phone number | O | | 9.2.xx | |
| Address | O | | 9.2.xx | |
| Postcode | O | | 9.2.xx | |
| HeNB-GW Id | O | | 9.2.xx | |

MOBILE COMMUNICATIONS SYSTEM, GATEWAY, METHOD OF CONTROLLING GATEWAY, AND COMPUTER READABLE MEDIUM THEREFOR

CROSS-REFERENCE TO RELATED APPLICATION

This application is based upon and claims the benefit of priority from Japanese patent application No. 2012-140300, filed on Jun. 22, 2012, the disclosure of which is incorporated herein in its entirety by this reference.

BACKGROUND

Exemplary embodiments of the present invention relate to a mobile communications system, a gateway device, and a communication method.

In Long Term Evolution (LTE) mobile communications systems using Evolved Packet Core (EPC) as the core network, the location information of a mobile station is used when determining routing of an emergency call ("Functional stage 2 description of Location Services (LCS)" [3GPP TS23.271 v10.2.0] and "IP Multimedia Subsystem (IMS) emergency sessions" [3GPP TS23.167 v11.4.0]). As the location information, the identifier (cell identity) of a cell where the mobile station is located is used in some cases.

On the other hand, in recent mobile communications systems, there are cases that provide a femtocell service by introducing a small radio base station called a femto base station, in addition to the existing radio base station. In LTE mobile communications systems, the femto base station is called Home evolved Node B (HeNB). The area of the cell covered by the femto base station is several meters to several tens of meters in general. Further, a large number of femto base stations are deployed in the system in most cases. This is obvious from the fact that one telecommunications carrier needs to support at least one hundred and twenty-five million CSG (Closed Subscriber Group) identifiers according to "Service requirements for Home Node B (HNB) and Home eNode B (HeNB)" [3GPP TS22.220 v11.3.0], which describes the service requirements for HeNB.

Further, in the architecture specified by Third Generation Partnership Project (3GPP), there is a case where Home evolved Node B Gateway (HeNB-GW) is optionally placed between HeNB and Mobility Management Entity (MME), which is the core network node in the upper level. The use of an interface between HeNB and HeNB-GW and MME is specified as S1 Application Protocol (S1AP) by "Evolved Universal Terrestrial Radio Access Network (E-UTRAN); S1 Application Protocol (S1AP)" [3GPP TS36.413 v10.3.0].

The above-described background art has the following issues.

For example, at the time of making a call connection for an emergency call, the following problem occurs when searching for Public Safety Answering Point (PSAP), which is the destination to which the emergency call is to be routed on the core network side, based on the identifier of the cell to which the mobile station belongs. Specifically, because a large number of HeNBs exist in the LTE femto system as described above, it takes a long processing time when searching for PSAP based on the cell identifier (ECGI: E-UTRAN Cell Global Identifier) which has different values for different HeNBs. Further, because a large number of communications occur between devices in the network, a heavy load is placed on the network.

The same problem occurs when performing the operation related to charging or lawful intercept by using ECGI as the location information of a mobile station. Further, the same problem occurs also when performing the operation for an emergency call, charging or lawful intercept by using Tracking Area Identity (TAI) instead of ECGI.

However, none of the above related art teaches a means of solving at least one of the above problems or a message interface between devices. Thus, an object of certain exemplary embodiments is to provide a mobile communications system, a gateway device, and a communication method capable of solving any of the above issues.

SUMMARY

In a first exemplary aspect of certain exemplary embodiments, there is provided a mobile communications system including a radio base station that forms a cell and communicates with a mobile station, a gateway device that communicates with the radio base station, and a core network device that communicates with the gateway device, the radio base station including a transmitting unit that transmits a first message containing identification information of the radio base station and surrounding environment information of the radio base station to the gateway device, the gateway device including a receiving unit that receives the first message from the radio base station, a storing unit that stores at least one of the identification information and the surrounding environment information, and a first cell identifier in association with one another, a processing unit that determines the first cell identifier corresponding to a cell of the radio base station based on the storing unit and the first message, and a transmitting unit that, when a second message containing a second cell identifier associated with the cell of the radio base station is received from the radio base station, transmits the second message containing the first cell identifier to the core network device, and the core network device including a receiving unit that receives the second message containing the first cell identifier from the gateway device.

In a second exemplary aspect of certain exemplary embodiments, there is provided a gateway device in a mobile communications system including a radio base station that forms a cell and communicates with a mobile station, the gateway device that communicates with the radio base station, and a core network device that communicates with the gateway device, the gateway device including a receiving unit that receives a first message containing identification information of the radio base station and surrounding environment information of the radio base station from the radio base station, a storing unit that stores at least one of the identification information and the surrounding environment information, and a specified value of a first cell identifier in association with one another, a processing unit that determines the first cell identifier corresponding to a cell of the radio base station based on the storing unit and the first message, and a transmitting unit that, when a second message containing a second cell identifier associated with the cell of the radio base station is received from the radio base station, transmits the second message containing the first cell identifier to the core network device.

In a third exemplary aspect of certain exemplary embodiments, there is provided a communication method by a gateway device in a mobile communications system including a radio base station that forms a cell and communicates with a mobile station, the gateway device that communicates with the radio base station, and a core network device that communicates with the gateway device, the method including a receiving step of receiving a first message containing identification information of the radio base station and surrounding environment information of the radio base station from the radio base station, a determining step of determining a first cell identifier corresponding to a cell of the radio base station based on a storing unit that stores at least one of the identification information and the surrounding environment information and the first cell identifier in association with one another, and the first message, and a transmitting step of, when a second message containing a second cell identifier associated with the cell of the radio base station is received from the radio base station, transmitting the second message containing the first cell identifier to the core network device.

According to the exemplary aspects of certain exemplary embodiments, it is possible to achieve reduction of the processing time and reduction of the load on a network for a process using information associated with a cell formed by a radio base station as the location information of a mobile station belong to the cell.

BRIEF DESCRIPTION OF THE DRAWINGS

The above and other aspects, features, and advantages of certain exemplary embodiments will become more apparent from the following description of certain exemplary embodiments when taken in conjunction with the accompanying drawings, in which:

FIG. 4A is a sequence chart showing an operation according to the second exemplary embodiment.

FIG. 4B is a sequence chart showing an operation according to the second exemplary embodiment.

FIG. 5 is an example of information transmitted from HeNB to HeNB-GW in the second exemplary embodiment.

FIG. 6 is an example of information transmitted from HeNB to HeNB-GW in the second exemplary embodiment.

FIG. 7 is an example of information transmitted from HeNB to HeNB-GW in the second exemplary embodiment.

FIG. 8 is an example of information transmitted from HeNB to HeNB-GW in the second exemplary embodiment.

FIG. 9A is an example of information transmitted from HeNB to HeNB-GW in the second exemplary embodiment.

FIG. 9B is an example of information transmitted from HeNB to HeNB-GW in the second exemplary embodiment.

FIG. 10 is an example of information transmitted from HeNB to HeNB-GW in the second exemplary embodiment.

EXEMPLARY EMBODIMENTS

Certain exemplary embodiments are described hereinafter with reference to the drawings. The word "exemplary" is used herein to mean "serving as an example, instance, or illustration". Any embodiment described herein as "exemplary" is not necessarily to be construed as preferred or advantageous over other embodiments.

First Exemplary Embodiment

Configuration

Figure 1:
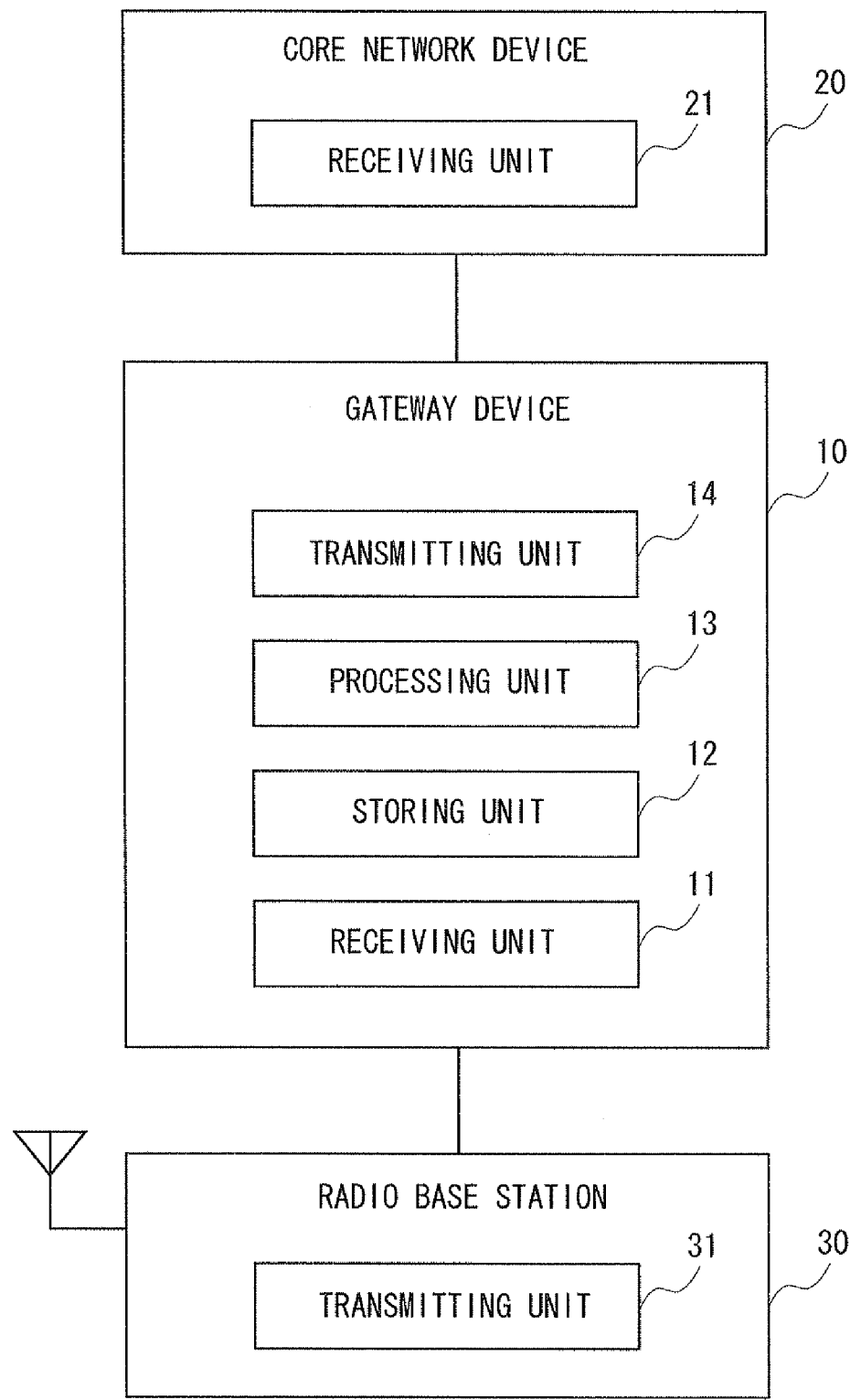
FIG. 1 is a diagram showing a configuration according to a first exemplary embodiment.

FIG. 1 is a diagram showing an example of a configuration according to the first exemplary embodiment. The configuration of a mobile communications system according to this exemplary embodiment is described hereinafter with reference to FIG. 1.

The mobile communications system according to this exemplary embodiment includes a gateway device 10, a core network device 20, and a radio base station 30. The radio base station 30 forms one or more cells and communicates with a mobile station (not shown) located in the cell by radio. The gateway device 10 communicates with the radio base station 30 and the core network device 20. The core network device 20 communicates with the gateway device 10.

The radio base station 30 includes a transmitting unit 31. The transmitting unit 31 transmits a first message containing identification information of the radio base station 30 and information about the surrounding environment of the radio base station 30 to the gateway device 10.

The gateway device 10 includes a receiving unit 11, a storing unit 12, a processing unit 13, and a transmitting unit 14. The receiving unit 11 receives the first message from the radio base station 30. The storing unit 12 stores a specified value of at least one of the identification information and the surrounding environment information of the radio base station 30 and a specified value of a first cell identifier in association with each other. The processing unit 13 determines a first cell identifier corresponding to a cell formed by the radio base station 30 based on the first message and the storing unit 12. When a second message containing a second cell identifier associated with the cell of the radio base station 30 is received from the radio base station 30, the transmitting unit 14 transmits the second message, containing the first cell identifier, to the core network device 20.

The core network device 20 includes a receiving unit 21. The receiving unit 21 receives the second message containing the first cell identifier from the gateway device 10.

[Operation]

Figure 2:
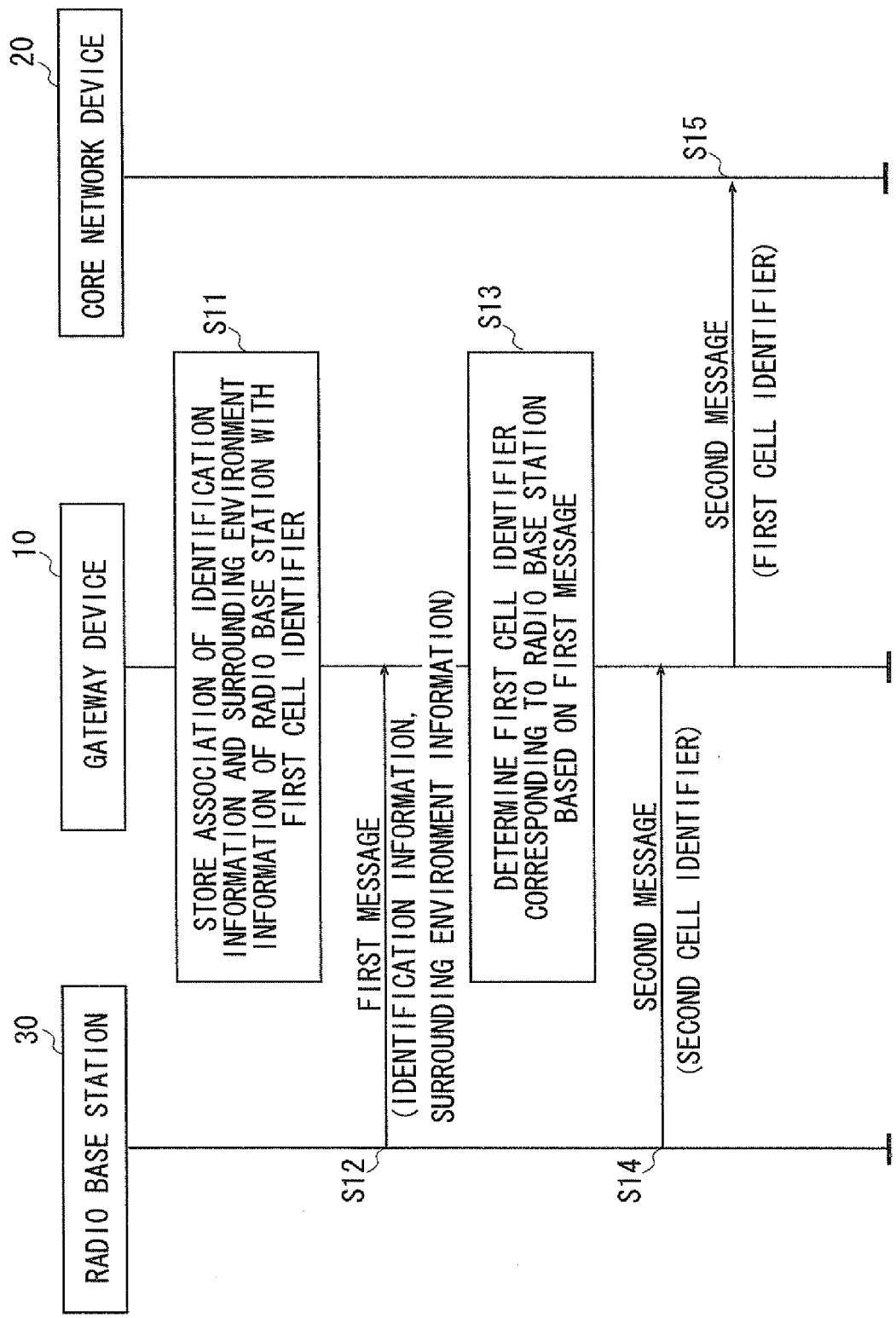
FIG. 2 is a sequence chart showing an operation according to the first exemplary embodiment.

FIG. 2 is a sequence chart showing an operation according to the first exemplary embodiment. The operation of the mobile communications system according to this exemplary embodiment is described hereinafter.

First, the gateway device 10 stores information in which a specified value of at least one of the identification information of the radio base station 30 and the surrounding environment information of the radio base station 30 is associated with a specified value of the first cell identifier (Step S11).

Next, the radio base station 30 transmits the first message containing the identification information of the radio base station 30 and the surrounding environment information of the radio base station 30 to the gateway device 10 (Step S12).

Then, the gateway device 10 determines the first cell identifier corresponding to the radio base station 30 based on the information stored in Step S11 and the identification information of the radio base station 30 or the surrounding environment information of the radio base station 30 contained in the first message received in Step S12 (Step S13).

After that, when the gateway device 10 receives the second message containing the second cell identifier corresponding to the cell formed by the radio base station 30 from the radio base station 30 (Step S14), the gateway device 10 transmits the second message, which contains the first cell identifier determined in Step S13, to the core network device 20 (Step S15)

As described above, in the mobile communications system according to this exemplary embodiment, one first cell identifier can be associated with a plurality of second cell identifiers. Then, the gateway device 10 can notify the first cell identifier in place of the second cell identifiers to the core network device 20. Thus, if the core network device 20 stores a result of a calculation process performed for the first cell identifier, the processing time of the calculation process for the same first cell identifier can be reduced. Further, in the case of performing the process in collaboration with an external node through a network, the load on the network can be reduced.

Second Exemplary Embodiment

Configuration

Figure 3:
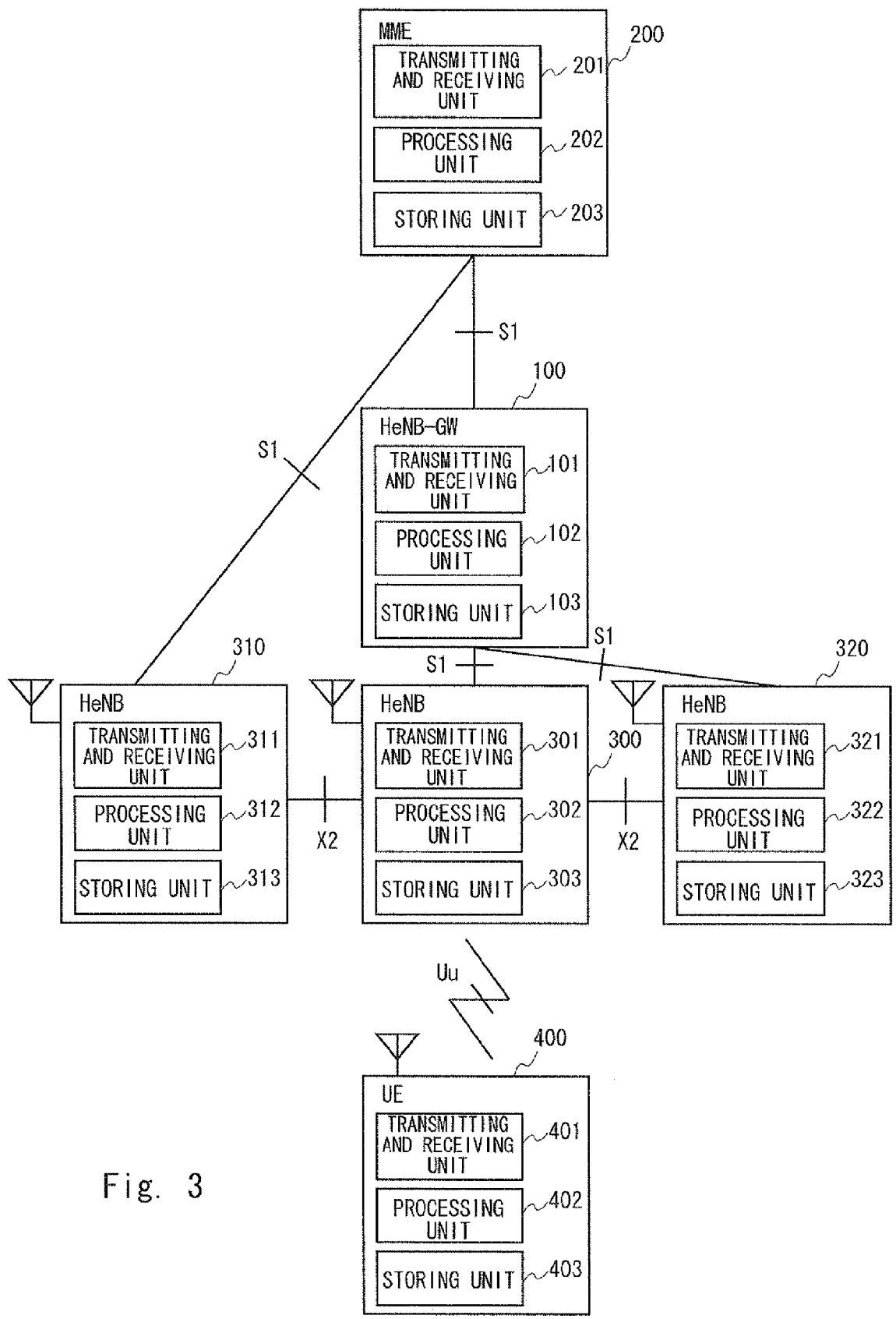
FIG. 3 is a diagram showing a configuration according to a second exemplary embodiment.

FIG. 3 is a diagram showing an example of a configuration according to the second exemplary embodiment. A mobile communications system according to this exemplary embodiment includes an HeNB-GW 100, an MME 200, an HeNB 300, and a UE (User Equipment) 400. Note that the UE 400 is also called a mobile station, a radio terminal or a user terminal.

The HeNB-GW 100 includes a transmitting and receiving unit 101, a processing unit 102, and a storing unit 103. The HeNB-GW 100 can communicate with the HeNB 300 and an HeNB 320 and transmits and receives messages using S1AP. Further, the HeNB-GW 100 can also communicate with the MME 200 and transmits and receives messages using S1AP in the same manner. The HeNB-GW 100 transmits and receives information in the transmitting and receiving unit 101, generates and analyzes the information to be transmitted and received in the processing unit 102, and stores the information to be transmitted and received in the storing unit 103.

The MME 200 includes a transmitting and receiving unit 201, a processing unit 202, and a storing unit 203. The MME 200 can communicate also with the HeNB 310, in addition to the HeNB-GW 100, and transmits and receives messages using S1AP. The MME 200 transmits and receives information in the transmitting and receiving unit 201, generates and analyzes the information to be transmitted and received in the processing unit 202, and stores the information to be transmitted and received in the storing unit 103. Note that the MME 200 can communicate also with an external node (not shown) other than the devices within the mobile communications system shown in FIG. 3, such as a device defined by IMS (IP Multimedia Subsystem).

The HeNB 300 includes a transmitting and receiving unit 301, a processing unit 302, and a storing unit 303. The same applies to the HeNB 310 and the HeNB 320. Some HeNB, like the HeNB 310, communicates with the MME 200 as the upper node, and other HeNB, like the HeNB 320 and HeNB 300, communicates with the HeNB-GW 100 as the upper node. The HeNB transmits and receives messages using S1AP to and from those upper nodes. Further, the HeNB 300, the HeNB 310 and the HeNB 320 can communicate with one another and transmit and receive messages using X2 protocol. Further, the HeNB 300 can communicate with the UE 400 by radio, and the interface is defined as Uu. The HeNB 300 transmits and receives information in the transmitting and receiving unit 301, generates and analyzes the information to be transmitted and received in the processing unit 302, and stores the information to be transmitted and received in the storing unit 303. The same applies to the HeNB 310 and the HeNB 320.

The UE 400 includes a transmitting and receiving unit 401, a processing unit 402, and a storing unit 403. The UE 400 communicates with the HeNB 300 by radio as described above. The UE 400 transmits and receives information in the transmitting and receiving unit 40, generates and analyzes the information to be transmitted and received in the processing unit 402, and stores the information to be transmitted and received in the storing unit 403.

[Operation]

FIGS. 4A and 4B are sequence charts showing an example of an operation according to the second exemplary embodiment. The operations of the UE 400, the HeNB 300, the HeNB-GW 100, the MME 200 and an external node 500 are described hereinafter with reference to FIGS. 4A and 4B.

First, in FIG. 4A, the HeNB-GW 100 stores information associating a specified value of at least one of eNB Identity and eNB Environment Information with a specified value of a substitute ECGI (S101). The HeNB-GW 100 may acquire the information about the association from another device through a network or from settings by a maintainer, and the way to acquire the information is not particularly limited. Further, the association may be made between the value A1 or A2 of the eNB Identity and the value X1 of the substitute ECGI, for example. Further, the association may be made between the value B1 to B5 of the eNB Environment Information and the value X2 of the substitute ECGI. Further, a combination of a value of the eNB Identity and a value of the eNB Environment Information may be associated with the substitute ECGI, such as the association of the value A3 of the eNB Identity and the value B6 of the eNB Environment Information with the value X3 of the substitute ECGI. Note that the eNB Identity is an identifier that identifies a radio base station, and the eNB Environment Information is information about the surrounding environment of a radio base station, though the details are described later.

The following operation differs between the case where S1 connection is not yet established (S110) and the case where S1 connection is already established (S120), and each case is described below.

First, in the case where S1 connection is not yet established (S110), the HeNB 300 transmits S1 Setup Request, which is S1AP message, to the HeNB-GW 100 (S111). The S1 Setup Request is the first message to be transmitted from the HeNB to the HeNB-GW after a connection of Transport Network Layer (TNL) becomes available in order to establish S1 connection, and its details are described in "Evolved Universal Terrestrial Radio Access Network (E-UTRAN); S1 Application Protocol (S1AP)" [3GPP TS36.413 v10.3.0]. The message contains the eNB Identity and the eNB Environment Information of the HeNB 300.

Next, the HeNB-GW 100 determines the substitute ECGI corresponding to the HeNB 300 based on the received S1 Setup Request message (S112). Specifically, the HeNB-GW 100 determines the substitute ECGI corresponding to the HeNB 300 by referring to the information related to the association stored in Step S101 based on the eNB Identity and the eNB Environment Information of the HeNB 300 contained in the message. For example, the value of the substitute ECGI in the above example is determined as X1 when the value of the eNB Identity contained in the message is A2. Likewise, the substitute ECGI is determined as X2 when the value of the eNB Environment Information is B1. Further, the substitute ECGI is determined as X3 when the value of the eNB Identity is A3 and the value of the eNB Environment Information is B6. Note that the HeNB-GW 100 may determine the substitute ECGI using both of the eNB Identity and the eNB Environment Information or using either one of them.

Then, the HeNB-GW 100 transmits the S1 Setup Request received from the HeNB 300 to the MME 200 (S113).

On the other hand, in the case where S1 connection is already established (S120), the HeNB 300 transmits eNB Configuration Update, which is S1AP message, to the HeNB- GW 100 (S121). The details of the eNB Configuration Update are described in "Evolved Universal Terrestrial Radio Access Network (E-UTRAN); S1 Application Protocol (S1AP)" [3GPP TS36.413 v10.3.0]. The message contains the IE of the eNB Identity and the eNB Environment Information, just like the S1 Setup Request described above.

The operation of the following Step S122 is the same as Step S112, and the operation of Step S123 is the same as Step S113, and not redundantly described.

The Information Element (IE) of the S1 Setup Request and the eNB Configuration Update is described hereinafter with reference to FIGS. 5 to 10.

FIG. 5 is a diagram showing an example of the IE of the S1 Setup Request. FIG. 6 is a diagram showing an example of the IE of the eNB Configuration Update. The eNB Identity and the eNB Environment Information contained in both messages are described in detail hereinbelow.

FIG. 7 is a diagram showing an example of details of the IE contained in eNB Identity. The eNB Identity is the IE for identifying a radio base station.

FIG. 8 is a diagram showing an example of details of the eNB Environment Information. The eNB Environment Information is made up of Radio Information, which is information related to the radio environment, and Non Radio Information, which is information related to those other than the radio environment.

FIGS. 9A and 9B are diagrams showing an example of details of the IE contained in the Radio Information. The IE of E-UTRAN Cell ID Information contains various types of information related to cells of Enhanced Universal Terrestrial Radio Access Network (E-UTRAN). The IE of UTRAN Cell ID Information contains various types of information related to cells of Universal Terrestrial Radio Access Network (UTRAN). The IE of GERAN Cell ID Information contains various types of information related to cells of Global System for Mobile Communications EDGE Radio Access Network (GERAN). The IE of WiMAX base stations Information contains various types of information related to base stations of Worldwide Interoperability for Microwave Access (WiMAX). The IE of Wireless Internet hotspots Information contains various types of information related to wireless Internet hot spots. The IE of Television stations Information contains various types of information related to television stations. The IE of Radio Stations Information contains various types of information related to radio stations. The IE of GPS Information contains various types of information related to Global Positioning System (GPS). Note that, although the information related to GPS includes location information such as latitude, longitude and altitude as shown in FIG. 9B, Such information is not limited to the information acquired using GPS in the radio base station. The information may be set from an O&M (operation and maintenance) of the radio base station or set manually by a maintainer of the radio base station.

FIG. 10 is a diagram showing an example of details of the IE contained in the Non Radio Information. CHOICE IP Address is the IE indicating an Internet Protocol (IP) address that is assigned to the radio base station. Phone number, Address and Postcode are the IE indicating the phone number, address and postcode, respectively, related to the place where the radio base station is located. HeNB-GW ID is the IE indicating the identification information of HeNB-GW to which HeNB is last connected in the case where the radio base station is HeNB.

An operation in the case where certain exemplary embodiments are applied to a process of searching for PSAP when an emergency call is made from the UE 400 is described with reference to FIG. 4B.

First, RRC (Radio Resource Control) connection is established between the UE 400 and the HeNB 300 (S201). Its details are well known to those skilled in the art and not directly related to certain exemplary embodiments, and therefore the description thereof is omitted.

Next, the HeNB 300 transmits Initial UE Message, which is S1AP message, to the HeNB-GW 100 (S202). The message contains RRC Establishment cause and ECGI of the HeNB 300 as the IE.

Then, the HeNB-GW 100 checks the RRC Establishment cause (S203).

When the RRC Establishment cause is "emergency" indicating an emergency call (S210), the HeNB-GW 100 substitutes the substitute ECGI determined in Step S112 or S122 for the ECGI of the HeNB 300 acquired in Step S202 (S211).

After that, the HeNB-GW 100 transmits the Initial UE Message, which contains the substitute ECGI substituted in Step S211, to the MME 200 (S212).

Then, the MME 200 and the external node 500 make a search for PSAP to which the emergency call is to be routed (S213). In the case where the cell information is used as the location information of the UE 400, the MME 200 executes a search for PSAP based on the substitute ECGI contained in the received Initial UE Message. On the other hand, in the case where more accurate information than the cell information is needed as the location information of the UE 400, the MME 200 executes the sequence that acquires the location information through a network with the external node 500 and executes a search for PSAP based on the acquired location information. By associating a certain range of the eNB Identity or a certain range of the eNB Environment Information with one substitute ECGI in Step S101, the number of substitute ECGIs can be reduced with respect to the number of ECGIs possibly assigned to the HeNB 300. Therefore, if the MME 200 and the external node 500 store a result of a search for PSAP that has been made based on the substitute ECGI, they can skip a search for PSAP against the same substitute ECGI next time. It is thereby possible to reduce the search processing time for PSAP, reduce the processing load on the MME 200 and the external node 500, and reduce the load on the network.

On the other hand, when, as a result of checking in Step S203, the RRC Establishment cause is different from "emergency" (S220), the HeNB-GW 100 transmits the Initial UE Message, which contains the ECGI acquired in Step 202, to the MME 200 (S221).

After that, the HeNB 300, the HeNB-GW 100 and the MME 200 perform Location Reporting Procedure specified by S1AP (S232 to S234). First, the MME 200 transmits Location Reporting Control, which is S1AP message, to the HeNB-GW 100 (S231). Next, the HeNB-GW 100 transfers the message to the HeNB 300 (S232). The HeNB 300 transmits Location Report containing ECGI and TAI as IE to the HeNB-GW 100 (S233). The HeNB-GW 100 transfers this message to the MME 200 (S234).

Then, the MME 200 identifies the cell where the UE 400 is located based on the received ECGI and TAI (S235).

The MME 200 can thereby locate the UE 400. Further, in the case where Event in Request Type, which is the IE of the message in Step S231, is set to Change of service cell, the MME 200 receives the message of Step S234 each time the UE 400 moves to a different cell, or a different HeNB 300. Thus, even when the UE 400 moves to a different HeNB 300 cell after it has made an emergency call in a specific HeNB 300 cell, the MME 200 can receive the ECGI and TAI of the cell where the UE 400 is located, so that the UE 400 can be kept tracked of. In this manner, according to certain exemplary embodiments, it is possible to realize the processing of integrating a large number of ECGIs into a small number of substitute ECGIs for the purpose of reducing the processing time and further allows a host device in the network to detect the movement of the UE by performing Location Reporting Procedure after that. In addition, when a host device in the network requires information of the ECGI and TAI of the HeNB 300 with which the UE 400 communicates for the purpose of charging or lawful intercept, it is possible to allow the host device to acquire the information.

Although certain exemplary embodiments are described in the foregoing, the present invention is not restricted to the above-described exemplary embodiments, and various changes and modifications may be made without departing from the scope of the invention.

For example, although ECGI is used as the location information of the UE 400 in the second exemplary embodiment, TAI may be used instead.

Further, although certain exemplary embodiments are applied to a call connection sequence for an emergency call in the second exemplary embodiment, certain exemplary embodiments may be applied to the operation of lawful intercept or charging in the case where ECGI or TAI is used as the location information of the UE. Note that, in this case, the tracking of the UE 400 can be done in the same manner as the case of an emergency call described above in the operations in Steps S231 to S235 of FIG. 4B. Therefore, the identification and tracking of the current location of a target of intercept can be achieved in lawful intercept. Further, in charging, because it is possible to keep track of the HeNB to which the UE is connected, accurate charging can be made even when the charge is different depending on the HeNB used.

Further, in the mobile communications system specified by 3GPP, the HeNB-GW does not necessarily exist. When there is no HeNB-GW, the HeNB 300 may exchange messages with the MME 200 using S1AP, and the MME 200 may perform the operation of the HeNB-GW 100 in the second exemplary embodiment. In other words, a host device which the HeNB 300 according to the exemplary embodiments communicates with may be any of the HeNB-GW 100 and the MME 200. Further, in the case where the host device is the MME, certain exemplary embodiments can be applied to the system in which the HeNB is replaced with eNB.

Further, although certain exemplary embodiments are applied to the LTE mobile communications system including UE, HeNB, HeNB-GW and MME in the second exemplary embodiment, certain exemplary embodiments may be applied to a 3rd Generation (3G) mobile communications system including UE, Home Node B (HNB), HNB Gateway (HNB-GW) and Mobile Switching Center (MSC)/serving GPRS support node (SGSN). Further, the present invention may be applied to a mobile communications system including a macro base station such as Node B (NB) or evolved Node B (eNB), rather than a femto base station such as HNB or HeNB.

While certain exemplary embodiments has been particularly shown and described with reference to exemplary embodiments thereof, certain exemplary embodiments is not limited to these embodiments.

It should be noted that the present inventive concept is not limited to the above exemplary embodiments but modification can be made as needed without deviating from the spirit and scope as defined by the claims.

What is claimed is:

1. A mobile communications system comprising:
   a base station adapted to form one or more cells, and to communicate with a mobile station;
   a gateway adapted to communicate with the base station; and
   a core network device adapted to communicate with the gateway,
   wherein the base station transmits a first message including:
   identification information of the base station; and
   one or more parameters indicating an environment of the base station,
   wherein the gateway comprises:
   a receiver adapted to receive the first message;
   a memory adapted to store correspondence information including:
   a cell identifier in association with at least one of the identification information and the one or more parameters, the cell identifier being different from the identification information and the one or more parameters which is in association with the cell identifier itself;
   a controller adapted to determine the cell identifier, corresponding to a cell of the base station, based on the correspondence information and the first message, and to generate a second message, including the determined cell identifier; and
   a transmitter adapted to transmit the second message to the core network, and
   wherein the core network device receives the second message from the gateway.

2. The system according to claim 1, wherein if the second message comprises information indicating an emergency call, the core network device performs a search for a destination of the emergency call.

3. The system according to claim 1, wherein the gateway is Home evolved Node B GateWay (HeNB GW).

4. The system according to claim 1, wherein the first message is S1 Setup Request or eNB Configuration Update, and the second message is Initial UE Message.

5. The system according to claim 1, wherein the one or more parameters comprise information about a radio environment around the base station.

6. The system according to claim 1, wherein the one or more parameters comprise at least one of:
   information about Evolved Universal Terrestrial Radio Access Network cell (E-UTRAN cell);
   information about Universal Terrestrial Radio Access Network cell (UTRAN cell);
   information about GSM EDGE Radio Access Network cell (GERAN cell);
   information about Worldwide Interoperability for Microwave Access base station (WiMAX base station);
   information about wireless Internet hot spot;
   information about television station;
   information about radio station; and
   information about Global Positioning System (GPS).

7. The system according to claim 1, wherein the one or more parameters include at least one of:
   an IP address assigned to the base station,
   an address,
   a postcode and a phone number related to a place where the base station is located, and
   identification information of HeNB-GW to which the base station has been previously connected.

8. A gateway adapted to communicate with a base station, the gateway comprising:
   a receiver adapted to receive an incoming message including:
   identification information of the base station; and one or more parameters indicating an environment of the base station;
a memory adapted to store correspondence information including:
a cell identifier in association with at least one of the received identification information and the received one or more parameters, the cell identifier being different from the identification information and the one or more parameters which is in association with the cell identifier itself;
a controller adapted to determine the cell identifier, corresponding to a cell of the base station, based on the correspondence information and the incoming message, and to generate an outgoing message, including the determined cell identifier, to be sent to a core network device; and
a transmitter adapted to transmit the outgoing message.

9. A method of controlling a gateway, the method comprising:
receiving an incoming message including:
identification information of a base station connected to the gateway; and
one or more parameters indicating an environment of the base station;
storing correspondence information including:
a cell identifier in association with at least one of the received identification information and the received one or more parameter, the cell identifier being different from the identification information and the one or more parameters which is in association with the cell identifier itself;
determining the cell identifier, corresponding to a cell of the base station, based on the correspondence information and the incoming message;
generating an outgoing message, including the determined cell identifier, to be sent to a core network device; and
transmitting the outgoing message.

10. A non-transitory computer readable medium including instructions for controlling a processor to implement a method of controlling a gateway, the method comprising:
receiving an incoming message including:
identification information of a base station connected to the gateway; and
one or more parameters indicating an environment of the base station;
storing correspondence information including:
a cell identifier in association with at least one of the received identification information and the received one or more parameters, the cell identifier being different from the identification information and the one or more parameters which is in association with the cell identifier itself;
determining the cell identifier, corresponding to a cell of the base station, based on the correspondence information and the incoming message;
generating an outgoing message, including the determined cell identifier, to be sent to a core network device; and
transmitting the outgoing message.

* * * * *